3,325,397
CATALYTIC HYDROCARBON CONVERSION WITH THE USE OF A CATALYST COMPOSITE COMPRISING A MANGANESE PROMOTED CRYSTALLINE ALUMINOSILICATE
Charles J. Plank, Woodbury, and Edward J. Rosinski, Almonesson, N.J., assignors to Mobil Oil Corporation, a corporation of New York
No Drawing. Filed Dec. 6, 1963, Ser. No. 328,466
11 Claims. (Cl. 208—120)

This invention relates to the catalytic conversion of hydrocarbon oils into lower normally liquid and normally gaseous products and to an improved catalyst for effecting said conversion. More specifically, the invention relates to catalytic cracking of hydrocarbon oils in the presence of a new and improved catalyst. The present application is a continuation-in-part of our copending application Ser. No. 87,446, filed Feb. 6, 1961, now abandoned, which in turn is a continuation-in-part of copending application Ser. No. 42,284, filed July 12, 1960, and now U.S. Patent 3,140,249.

In one embodiment, the present invention is concerned with a cracking catalyst comprising a manganese-containing crystalline aluminosilicate intimately admixed with a porous matrix therefor, which catalyst is characterized by unusual attrition resistance, activity, selectivity and stability to deactivation by steam. In another embodiment, the invention is directed to a method for preparing the aforementioned catalyst useful in catalytic cracking of heavy petroleum fractions to lighter materials in the gasoline range.

As is well known, there are numerous materials both of natural and synthetic origin which have the ability to catalyze the cracking of hydrocarbons. However, the mere ability to catalyze cracking is far from sufficient to afford a catalyst of commercial significance. Of the presently commercially available cracking catalysts, a synthetic silica-alumina composite catalyst is by far the most widely used. While such type catalyst is superior in many ways to the earlier employed clay catalysts and is fairly satisfactory, it is subject to improvement particularly in regard to its ability to afford a high yield of useful product with a concomitant small yield of undesired product.

Modern catalytic processes, moreover, require catalysts which are not only specifically active in the chemical reactions which are to be catalyzed but also possess physical characteristics required for successful commercial operation. One of the outstanding physical attributes of a commercial catalyst is hardness, i.e. the ability to resist attrition. The ability of a particle to hold its shape in withstanding the mechanical handling to which it is subjected upon storage, shipment and use is a primary requirement for a successful catalyst and for modern catalytic processes.

Thus, commercial catalytic cracking has been carried out by contacting a hydrocarbon charge in the vapor or liquid state with a catalyst of the type indicated hereinabove under conditions of temperature, pressure and time to achieve substantial conversion of the charge to lower boiling hydrocarbons. Such cracking processes are generally advantageously carried out employing a method wherein the catalyst is subjected to continuous handling. In these operations, a continuously moving stream of hydrocarbon feed is contacted with a continuously moving stream of catalyst for the accomplishment of conversion and thereafter the catalyst is continuously regenerated and returned to the conversion zone. This continuous handling and regeneration of the catalyst particles results in considerable breakage and constant abrasion consuming the catalyst and giving rise to an excessive amount of fines which are a loss and generally cannot be reused in the same catalytic equipment. Furthermore, there is a tendency for the catalyst fines suspended in the gas or vapor present to act as an abrasive in a manner analogous to sand blasting. This not only wears away the equipment but also causes the catalyst to take up foreign matter detrimental to its catalytic properties. A hard porous catalyst having the ability to withstand abrasion during the necessary handling involved during continual conversion and regeneration is definitely to be desired.

During catalytic conversion of high boiling hydrocarbons to lower boiling hydrocarbons the reaction which takes place is essentially a cracking to produce lighter hydrocarbons but is accompanied by a number of complex side reactions such as aromatization, polymerization, alkylation and the like. As a result of these complex reactions a carbonaceous deposit is laid down on the catalyst commonly called "coke." The deposition of coke tends to seriously impair the catalytic efficiency of the catalyst for the principal reaction and the conversion reaction is thereafter suspended after coke to the extent of a few percent by weight has accumulated on the catalyst. The catalytic surface is then regenerated by burning the coke in a stream of oxidizing gas and the catalyst is returned to the conversion stage of the cycle. As will be realized coke and other undesired products are formed at the expense of useful products such as gasoline. It will also be evident that during the period of regeneration the catalyst is not being effectively employed for conversion purposes. It is accordingly highly desirable not only to afford a large overall conversion of the hydrocarbon charge, i.e. to provide a catalyst of high activity but also to afford an enhanced yield of useful product such as gasoline while maintaining undesired products such as coke at a minimum. The ability of a cracking catalyst to so control and to direct the course of conversion is referred to as selectivity. Thus, an exceedingly useful and widely sought characteristic in a cracking catalyst is high selectivity.

Another important property desirable in a cracking catalyst is steam stability, i.e. the ability not to become deactivated in the presence of steam at an excessively high rate. As a result of coke formation, it has generally been necessary to regenerate the catalyst at frequent intervals first by stripping out entrained oil by contacting with steam and then burning off the carbonaceous deposits by contacting with an oxygen-containing gas at an elevated temperature. However, it has been found that the cracking activity of the catalyst deteriorates upon repeated use and the silica-alumina catalysts heretofore employed are sensitive to steaming. Since steaming has been found to be the most effective way of removing entrained oil from the spent catalyst prior to thermal regeneration with air and, since steam is encountered in the seals and kiln of a commercial catalytic cracking unit, it is apparent that a catalyst characterized by good steam stability is definitely to be desired.

Inorganic oxide amorphous gels heretofore employed as hydrocarbon conversion catalysts have generally been prepared by the formation of a sol of desired composition that sets to a hydrogel after lapse of a suitable period of time. The hydrogel is then dried to remove the liquid phase therefrom. It has heretofore been suggested that various finely divided water-insoluble solids be added to the sol before the same undergoes gelatin for the purpose of increasing the porosity of the ultimate dried gel so that the regeneration characteristics thereof are enhanced upon use in catalytic hydrocarbon conversion operations. It has also been proposed that pulverized dried gel, clay, and similar materials to be incorporated in the hydrosol before gelation in order that the hydrogel resulting upon setting of such hydrosol may be subjected to rapid drying without undergoing substantial breakage. The improved regeneration characteristics and the improvement in drying obtained have been attributed to the fact that the finely divided solid contained in the hydrosol does not shrink to the extent that the hydrogel does during drying thereby creating in the resulting dry gel a large number of macropores having diameters greater than about 1000 angstrom units. While the gels so prepared containing pulverized material of appreciable particle size exhibit improvement in regeneration and during drying, the physical strength thereof has been weakened due to the presence of large pores in the gel structure.

Gel preparation has heretofore been carried out by drying hydrogel in a mass, which is subsequently broken up into pieces of desired size. Hydrogel has also been prepared and dried in the form of small pieces of predetermined shape such as obtained by extrusion, pelleting or other suitable means. In more recent years, gels have been produced in the form of spheroidal bead-like particles. The latter have had the advantage over irregularly shaped gel particles and over those obtained by extrusion or pelleting by being more resistant to attrition. The incorporation of finely divided solids of the type referred to hereinabove in the hydrosol used for the formation of gel beads has been found to undesirably decrease the hardness characteristics thereof, rendering the gel beads so produced more susceptible to attrition.

In accordance with the present invention there is now provided a catalyst for conversion of hydrocarbons characterized by resistance to attrition, high activity, exceptional selectivity, and steam stability resulting from intimate admixture of a finely divided manganese-containing aluminosilicate and a porous matrix therefor. The latter is suitably an inorganic oxide such as clay or a gel combined with the manganese-containing aluminosilicate under conditions such that the aluminosilicate is distributed throughout and hold suspended therein. Thus, in one embodiment, the manganese-containing aluminosilicate is intimately combined with an inorganic oxide hydrogel which composite is subsequently washed free of water-soluble matter, dried and thermally activated. The catalyst of the present invention in contrast to previous conventional cracking catalysts is produced from a crystalline aluminosilicate having a structure of rigid three-dimensional networks characterized by uniform pores between about 4 and about 15 angstrom units in diameter. The uniform pore openings in such range occur in all dimensions and permit easy access to the surface of all hydrocarbon reactant molecules and afford ready release of the product molecules. There is thus provided in accordance with the present invention, a catalyst characterized by exceptional activity, selectivity and stability when employed in cracking heavy petroleum hydrocarbons to lighter materials boiling in the range of gasoline.

In one embodiment, the present invention provides a method for preparing a unique cracking catalyst by dispersing in an inorganic oxide sol a finely divided aluminosilicate resulting from substantially complete base exchange of the alkali metal content of a crystalline alkali metal aluminosilicate having uniform pore openings between 4 and 15 angstrom units with an aqueous solution containing manganese ions, effecting gelatin of said sol, washing the resulting hydrogel containing finely dispersed aluminosilicate free of water-soluble matter, drying and thermally activating the washed product.

In another embodiment, the present invention affords an effective cracking catalyst comprising a finely divided aluminosilicate substantially free of alkali metal resulting from base-exchange of a crystalline alkali metal aluminosilicate having uniform pore openings between 4 and 15 angstrom units with an aqueous solution containing manganese ions, said finely divided aluminosilicate being distributed in an amount corresponding to between about 2 and about 90 percent by weight of the finished catalyst in a porous inorganic oxide matrix.

In still another embodiment the present invention provides a cracking catalyst having exceptional stability, activity and selectivity prepared by dispersing in a porous matrix a finely divided crystalline alkali metal aluminosilicate, base-exchanging the product with a solution containing manganese ions to substantially reduce the alkali metal content thereof and drying and thermally activating the base-exchanged product.

A still further embodiment of the invention affords a method for preparing a catalyst by dispersing in a porous matrix, a powdered crystalline alkali metal aluminosilicate having uniform pore openings between 4 and 15 angstrom units, base-exchanging the resulting product with an aqueous manganese salt solution, washing the base-exchanged material free of soluble anions, drying and subjecting the resulting product to treatment with steam at a temperature in the range of 500° F. to 1500° F. for at least about 2 hours.

A still further embodiment of the invention resides in a process for catalytic cracking of hydrocarbon oils in the presence of the above catalyst in accordance with which an enhanced conversion of the charge stock to useful products is realized.

The crystalline alkali metal aluminosilicate employed in preparation of the instant catalyst are frequently referred to as synthetic zeolites. Such substances have been generally described by Barrer in several publications and in U.S. 2,306,610 and U.S. 2,413,134. These materials are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, inter-connected by a number of still smaller holes or channels. These cavities and channels are precisely uniform in size. The alkali metal aluminosilicate used in preparation of the present catalyst has a uniform pore structure comprising openings characterized by an effective pore diameter of between 4 and 15 angstroms.

In general, the process for preparing such alkali metal aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minuates to 90 hours or more. The product, which crystallizes within this hot mixture is separated therefrom and water washed until the water in equilibrium with the zeolite has a pH in the range of 9 to 12 and thereafter is dehydrated by heating.

Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While it is contemplated that alkali metal aluminosilicates having the above-designated pore characteristics may be employed in preparation of the present catalyst, it is generally preferred to use a sodium aluminosilicate. Thus, assuming soduim as the alkali metal, the reaction mixture should contain a molar ratio of $Na_2O/SiO_2$ of at least 0.2/1 and generally not in excess of 3/1. Sodium aluminate having a molar ratio of $Na_2O/Al_2O_3$ in the range of 1/1 to 3/1 may be employed. The amounts of sodium silicate solution and sodium aluminate solutions are such that the mol ratio of silica to alumina in the final mixture is at least 0.5/1. Preferably, the reaction solution has a composition expressed as mixtures of oxides, within the following ranges $SiO_2/Al_2O_3$ of 0.5 to 40, $Na_2O/SiO_2$ of 0.2 to 3.0 and $H_2O/Na_2O$ of 10 to 200. The reaction mixture is placed in a suitable vessel which is closed to the atmosphere in order to avoid losses of water and the reagents are then heated for an appropriate length of time. A convenient and generally employed process for making the sodium aluminosilicate reactant involves preparing an aqueous solution of sodium aluminate and sodium hydroxide and then adding an aqueous solution of sodium silicate. While satisfactory crystallization may be obtained at temperatures from 21° C. to 125° C., the pressure being atmospheric or less, corresponding to the equilibrium of the vapor pressure with the mixture at the reaction temperature, crystallization is ordinarily carried out at about 100° C. As soon as the zeolite crystals are completely formed, they retain their structure and it is not essential to maintain the temperature of the reaction any longer in order to obtain a maximum yield of crystals.

After formation, the crystalline aluminosilicate is separated from the mother liquor, usually by filtration. The crystalline mass is then washed, preferably with water, and while on the filter, until the wash water, in equilibrium with the aluminosilicate, reaches a pH of 9 to 12. For purposes of the present invention, the sodium aluminosilicate crystals may be added without drying to the porous matrix, such as inorganic oxide sol, hydrogel or clay or may alternatively be initially dried, generally at a temperature between 25° C. and 150° C.

The catalysts utilized in the present process are prepared by intimately admixing a crystalline alkali metal aluminosilicate such as described hereinabove having a structure of rigid three dimensional networks characterized by a uniform effective pore diameter between 4 and 15 angstrom units in finely divided form with a porous matrix therefor, base-exchanging the resulting composite substantially free of alkali metal by treating with a solution containing managanese ions capable of replacing the alkali metal, washing the resulting base-exchanged material free of water-soluble matter, drying the washed composite and subjecting the same to a thermal activating treatment.

Alternatively, the crystalline alkali metal aluminosilicate may undergo base-exchange as above prior to intimate admixture thereof with the porous matrix material. In accordance with such manner of operation, the resulting mixture of finely divided previously base-exchanged aluminosilicate distributed throughout and held suspended in a porous matrix is dried and thermally activated.

The binder or matrix material utilized in preparation of the present catalysts is generally an inorganic oxide composition, suitably an inorganic oxide gel or clay. However, various other binders, including those of organic composition may be used. Thus, representative matrices which can be employed include metals and alloys thereof, sintered metals and sintered glass, asbestos, silicon carbide aggregates, diatomaceous earths, activated charcoal, refractory oxides, organic resins, such as polyepoxides, polyamines, polyesters, vinyl resins, phenolics, amino resins, mellamines acrylics, alkyds, epoxy resins, etc.; clays and inorganic oxide gels. Of these matrices, clays and inorganic oxide gels are particularly preferred because of their superior porosity, attrition resistance and stability under the reaction conditions encountered.

Intimate admixture of the finely divided aluminosilicate and binder, such as inorganic oxide hydrogel may be accomplished, for example, by ball milling the two materials together over an extended period of time, preferably in the presence of water, under conditions to reduce the particle size of the aluminosilicate to a weight mean particle diameter of less than 40 and preferably less than 15 microns. Such method of admixture, however, is less preferred than that achieved by dispersing the powdered aluminosilicate in an inorganic oxide hydrosol. Following this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. As noted hereinabove, it is desirable that the aluminosilicate introduced into the hydrosol have a weight mean particle diameter less than 40 microns and preferably less than 15 microns, and when large particles are desired, between 2 and 7 microns. The use of aluminosilicate having a weight mean particle diameter in excess of 40 microns gave rise to a physically weak product while the use of aluminosilicate having a weight mean particle diameter of less than 1 micron produced a product low diffusinity.

The powder-containing inorganic oxide hydrogel sets to a hydrogel after lapse of a suitable period of time and the resulting hydrogel is base-exchanged with an aqueous solution containing manganese ions and is thereafter washed, dried to a gel and thermally activated at a temperature below the fusion point of the incorporated aluminosilicate powder. It has been found that the resulting inorganic oxide-manganese aluminosilicate product possesses unique properties as a cracking catalyst.

The inorganic oxide gel employed serves as a matrix for the crystalline aluminosilicate powder distributed therein. Such gel may be one of any hydrous inorganic oxide such as, for example, aluminous or siliceous gels. While alumina or silica gel may be utilized as a suitable matrix, it is preferred that the inorganic oxide gel employed be a cogel of silica and an oxide of at least one metal selected from the group consisting of metals of Groups IIA, IIIB and IVA of the Periodic Table. Such components include, for example, silica-alumina, silica-magnesia, silica-zirconia, silica-thoria, silica-beryllia, silica-titania as well as ternary combinations such as silica-alumina-thoria, silica-alumina-zirconia, silicia-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 percent by weight with the metal oxide content ranging from 0 to 45 weight percent. Inorganic oxide hydrogels utilized herein and hydrogels obtained therefrom may be obtained by any method well known in the art such as, for example, hydrolysis of ethylorthosilicate, acidification of an alkali metal silicate which may contain a compound of a metal, the oxide of which it is desired to cogel with silica, etc. The relative proportions of finely divided crystalline aluminosilicate and siliceous gel matrix may vary widely with the crystalline aluminosilicate content ranging from about 2 to about 90 percent by weight and, more usually, particularly where the composite is prepared in the form of beads in the range of about 15 to about 50 percent by weight of the composite.

The siliceous gel-aluminosilicate product may be prepared in any desired physical form. Thus, the hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. The method of the invention, as indicated above, has been found to be particularly useful for the production of catalyst in the form of spheroidal particles. The hydrosol containing powdered aluminosilicate produced in accordance with this invention may be made into spheroidal particles by any feasible process, such as methods described in patents to Marisic, for example, U.S. 2,384,946. Broadly, such methods involve introducing globules of hydrosol into a column of water-immiscible liquid; for example, an oil medium wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spherically shaped particles is of particular advantage in hydrocarbon conversion processes, including the moving catalyst bed processes, the fluidized process, etc. in which the spheroidal gel particles are subjected to continuous movement. As applied to the stationary bed, spheroidal catalyst particles provide effective contact between the reactants and the catalyst by avoiding channeling. It is accordingly a preferred embodiment of the present invention to prepare the described catalyst in the form of spheres, although it is to be realized that the method of the invention may also be employed in obtaining a mass of catalyst which may, thereafter, be broken up into particles of desired size. Likewise, the method described herein may be used for the preparation of the present catalysts in the form of particles of any other desired size or shape.

While, for the production of spheroidal catalyst particles by the aforementioned technique, initial formation of a hydrosol which sets upon lapse of a short interval of time to an all embracing bead-form hydrogel is essential, it is within the purview of this invention to also employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two.

As indicated hereinabove, the crystalline alkali metal aluminosilicate may be base-exchanged either before or after intimate admixture with the inorganic oxide matrix material. Base exchange is effected by treatment with a solution essentially containing manganese ions and generally characterized by a pH in excess of about 4 but below that at which precipitation of said ions is encountered, and preferably by a pH in the range of 4.5 to 7.5. The alkali metal content of the finished catalyst should be less than about 4; preferably less than 1 and still preferably less than 0.5 percent by weight. The base-exchanged solution may be contacted with the crystalline aluminosilicate of uniform pore structure in the form of a fine powder, a compressed pellet, extruded pellet, spheroidal bead or other suitable particle shape. It has been found that the desired base-exchange may be effected most readily if the alkali metal aluminosilicate undergoing treatment has not previously been subjected to a temperature above 600° F.

Base exchange required for introducing the necessary manganese ions is carried out for a sufficient period of time and under appropriate temperature conditions to replace at least about 75 and preferably at least 90 percent of the alkali metal originally contained in the aluminosilicate and to effectively reduce the alkali metal content of the resulting composite to below about 4 and preferably to below about 1 weight percent. It is contemplated that any ionizable compound of manganese may be employed for base-exchange either alone or in combination with other ions providing the crystalline structure of the alkali metal aluminosilicate is not destroyed. Compounds will be used wherein the replacing maganese ion is in the cationic state. Inorganic salts will usually be employed. Suitable manganese compounds include manganese bromide, manganese chloride, manganese nitrate, and manganese sulfate. Soluble compounds of calcium, magnesium, cerium, aluminum, lanthanum, praseodymium, neodymium, samarium and other rare earths, ammonium salts, mixtures of these ions may be present in the base exchange solution containing manganese ions. Thus, the base-exchange solution employed may be one in which manganese is the sole replacing ion or a combination of manganese with calcium, magnesium or rare earth metals may be used as the base-exchange media.

While water will ordinarily be the solvent in the base-exchange solutions used, it is contemplated that other solvents although generally less preferred may be used. thus, in addition to aqueous solutions, alcoholic solutions, etc. of suitable compounds as noted above may be employed in producing the catalyst utilized in the present process. It will be understood that the compouds employed for the base exchange solution undergo ionization in the particular solvent used.

The concentration of compound employed in the base exchange solution may vary depending on the nature of the particular compound used, on the alkali metal aluminosilicate undergoing treatment and on the conditions under which treatment is effected. The overall concentration of replacing ion, however, is such as to reduce the alkali metal content of the original alkali metal aluminosilicate to less than about 4 and preferably to less than about 1 percent by weight on a dry solids basis. Generally, the concentration of manganese compound, the cation of which replace alkali metal from the alkali metal aluminosilicate is within the range of 0.2 to 30 percent by weight, although as noted hereinabove other solution concentrations may be employed providing the alkali metal content is reduced to less than 4 and preferably less than about 1 percent by weight.

The temperature at which base-exchange is effected may vary widely generally ranging from room temperature to an elevated temperature below the boiling point of the treating solution. While the volume of base-exchange solution employed may vary widely, generally an excess is employed and such excess is removed for contact with the crystalline aluminosilicate after a suitable period of contact. The time of contact between the manganese containing base-exchange solution and crystalline aluminosilicate is such as to effect replacement of the alkali metal ions thereof to an extent such that the alkali metal content of the composite after undergoing base-exchange with the manganese ions is less than 4 and preferably less than 1 percent by weight. It will be appreciated that such period of contact may vary widely depending on the temperature of the solution, the nature of the alkali metal aluminosilicate used and the particular manganese compound employed for base-exchange either alone or combined with other soluble metal compounds noted above. Thus, the time of contact may extend from a brief period of the order of a few hours for small particles to longer periods of the order of days for large pellets.

After base-exchange treatment, the product is removed from the treating solution. Anions introduced as a result of treating with the base-exchange solution are removed by water-washing the treated composite for such period of time until the same is free of said anions. The washed product is then dried generally in air to remove substantially all the water theerfrom. While drying may be effected at ambient temperature, it is more satisfactory to facilitate the removal of moisture by maintaining the product at a temperature between about 150 and about 600° F. for 4 to 48 hours.

The dried material may then be subjected to an activating treatment to render the composition catalytically active. Such treatment entails heating the dried material in an atmosphere which does not adversely affect the catalyst such as air, nitrogen, hydrogen, flue gas, helium or other inert gas. Generally, the dried material is heated in air to a temperature in the approximate range of 500°

F. to 1500° F. for a period of at least about 1 hour and usually between 1 and 48 hours. The finished catalyst product has a surface area, within the approximate range of 100 to 700 squire meters per gram.

It has further been found that the catalyst selectivity of the above-described composition is greatly improved by subjecting the same to a mild steam treatment. Exposure of the catalyst to steam is, as will appear from data set forth hereinafter, a highly desirable step in obtaining a product capable of affording an enhanced yield of gasoline. Steam treatment may be carried out at a temperature within the approximate range of 500° F. to 1500° F. for at least about 2 hours. Usually, steam at a temperature of about 1000° F. to 1300° F. will be used with the treating period extending from about 2 to about 100 hours. Temperatures above 1500° F. may be detrimental and should generally be avoided. Also, an atmosphere consisting of a substantial amount of steam, say at least about 10 percent by volume, but containing air or other gas substantially inert with respect to the composite being treated may be used and such mixtures may, in some instances, be desirable with the use of the more elevated temperatures to avoid possible deactivation of the catalyst. The above-noted steam treatment serves to convert a substantial portion of the crystallinity of the original aluminosilicate to non-crystalline or amorphous material. It is thus a particular embodiment of the invention that at least about 25 percent and, preferably, at least 50 percent of the original crystallinity possessed by the aluminosilicate structure be converted to amorphous material to achieve a resulting catalyst product of optimum cracking characteristics.

Cracking, utilizing the catalyst described herein, may be carried out at catalytic cracking conditions employing a temperature within the approximate range of 700° F. to 1200° F. and under a pressure ranging from sub-atmospheric pressure up to several hundred atmospheres. The contact time of the oil with the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass or as a compact particle-form moving bed.

The cracking activity of the cataylst is a measure of its capacity to catalyze conversion of hydrocarbons and is expressed herein as the percentage conversion of a Mid-Continent gas oil having a boiling range of 450 to 950° F. to gasoline having an end point of 410° F. by passing vapors of the said gas oil through the catalyst at 900° F., substantially atmospheric pressure and a feed rate of 2–10 volumes of liquid oil per volume of catalyst per hour for ten minute runs between regenerations.

Steam stability of the catalyst prepared in accordance with the method described herein was determined by an accelerated test which simulates the conditions encountered during catalyst use. In this test, the catalyst is contacted with 100 per cent steam at 1225° F. and atmospheric pressure for 20 hours and the cracking activity is then determined and compared with the cracking activity of fresh, unsteamed catalyst. The results thus obtained are indicative of the stability of the catalyst.

It has been found desirable in analyzing the results obtained with the catalyst described hereinabove to compare the same with those realized with a conventional commercial silica-alumina gel cracking catalyst containing approximately 10 weight per cent alumina. The exceptional activity, stability and selectivity of the present catalyst is emphasized by the fact that when tested for gas oil cracking at a liquid hourly space velocity of 4 after being treated with 100 percent steam for 20 hours at 1225° F., the instant catalyst afforded about 58.5 percent conversion of the gas oil charge while a standard silica-alumina catalyst so treated gave only about 55 percent conversion at a liquid hourly space velocity of 2. Thus, the catalyst described herein is over twice as active as conventional silica-alumina cracking catalyst. In addition, the present catalysts have a very high degree of steam stability. Of even more importance is the fact that their selectivity in gas oil cracking is extraordinary. Using the instant cracking catalyst, it has been found possible to obtain up to 9.9 percent more gasoline than when the gas oil was cracked to the same extent over the conventional silica-alumina catalyst. Such additional gasoline is obtained at the expense of $C_4$'s and the undesirable products of cracking, i.e. dry gas and coke. The method of measuring and specifying selectivity of the instant catalyst was to compare the various product yields obtained with such catalyst with yields of the same products given by conventional silica-alumina catalyst at the same conversion level. The differences (Δ values) shown hereinafter represent the yields given by the present catalyst minus yields given by the conventional catalyst.

The following comparative examples serve to illustrate the advantages of the process and catalyst of the present invention without limiting the same:

*Example 1*

A catalyst was prepared by admixture of the following solutions.

I. Silicate solution: Lbs.
   A. Sodium silicate (28.8% $SiO_2$) _____ 28.15
      Water _____ 14.20
   B. Crystalline sodium aluminosilicate having a sodium content of 14 weight percent and containing 65% solids at 230° F. ____ 4.56
      Water _____ 11.56

Solution B was added to solution A forming a solution having a specific gravity of 1.190 at 74° F.

II. Acid solution: Lbs.
   Aluminum sulfate [$Al_2(SO_4)_3 \cdot 18H_2O$] _____ 4.23
   Sulfuric acid [97% $H_2SO_4$] _____ 1.98
   Water _____ 57.10

Solution II having a specific gravity of 1.056 at 72° F. and solution I were continuously mixed together through a mixing nozzle using 390 cc./minute of the acid solution at 42° F. and 398 cc./min. of the silicate solution at 72° F. The resulting hydrosol containing 25 percent by weight dispersed crystalline sodium aluminosilicate, on a finished catalyst basis, was formed into spheroidal hydrogel beads by introducing globules of the sol into an oil medium such as described in the aforementioned Marisic patent. The hydrosol particles so formed set to firm hydrogel beads in 2.2 seconds at a pH of 8.5 and a temperature of 65° F.

The resulting hydrogel beads were covered with a 2 percent by weight aqueous solution of manganese chloride ($MnCl_2 \cdot 4H_2O$) base-exchange solution immediately after forming, using ½ volume of solution per volume of beads. The manganese chloride base-exchange was continued for a total of fifteen 2-hour and five overnight (approximately 20 hours each) contacts at room temperature (approximately 75° F.). The base-exchanged hydrogel was then washed continuously until the effluent water was free of chloride ions. The washed hydrogel beads were then dried in air at 275° F. for 20 hours, calcined at 1000° F. in air for 10 hours, and stabilized by treating with 100 percent steam at 1225° F. for 20 hours at atmospheric pressure. The resulting catalyst, upon analysis, was found to contain 0.40 weight percent sodium, 7.3 weight percent manganese, 12 weight percent alumina and the balance silica. After the above-noted steam treating step, the catalyst and a surface area of 178 m.²/gram.

The above catalyst was evaluated for gas oil cracking. As will be evident from the cracking data hereinafter set forth in Table I, this catalyst afforded an approximately 49 percent conversion of the gas oil charge at 4 liquid hourly space velocity. In addition to the above activity, it is apparent from the data that the cracking selectivity of this catalyst also was good. Thus, at the 49 percent conversion level, this catalyst afforded 9.9 percent more gasoline as compared to the standard commercial silica-alumina catalyst. This gain was at the expense of 7 percent less $C_4$'s and 2 percent less dry gas than the standard silica-alumina catalyst.

*Example 2*

The catalyst of this example was prepared in a manner essentially identical with that of Example 1 except that a calcium chloride solution instead of manganese chloride solution was used for base exchange. The finished catalyst in this instance had a composition of 0.21 weight percent sodium, 5.74 weight percent calcium, 13 weight percent alumina and the balance silica. After steam treating the catalyst for 20 hours a 1225° F. and atmospheric pressure the surface area was 339 m.²/gram and the apparent density was 0.55 gram/cc.

This catalyst was evaluated for catalytic cracking in the manner described hereinabove and the data obtained are hereinafter summarized in Table I.

*Example 3*

The catalyst of this example was prepared in a manner entirely analogous to that for Example 2 except that a combination of 2 percent calcium chloride and 1 percent ammonium chloride exchanges was employed. Specifically, 3-two hour exchanges and one 16 hour exchange with 2 percent $CaCl_2$ were followed by 6-two hour and 2-16 hour exchanges with 2 percent $CaCl_2$-1 percent $NH_4Cl$. For each exchange one-half volume of solution per volume of hydrogel was used.

This catalyst was tested for activity and selectivity at a range of space velocities. The gasoline vs. conversion curve for this catalyst is shown in the single figure of the attached drawing. Comparing the results obtained with the catalysts of Examples 1 and 2 with this curve, it will be seen that while the result achieved with the catalyst of Example 2 lies on the curve, the manganese-containing catalyst of Example 1 afforded a 3.4 weight percent higher yield of gasoline over the calcium exchanged catalyst at the same conversion.

A comparison of the results obtained with the catalysts of Examples 4 and 5 below, as summarized in Table I, will show the exceptionally good retention of selectivity of the manganese-containing catalyst as compared with the calcium-containing catalyst after steam treatment under elevated pressure.

*Example 4*

The catalyst of this example was prepared by steam-treating a calcined portion of the catalyst of Example 2 for 10 hours at 1200° F. with 15 p.s.i.g. steam.

*Example 5*

The catalyst of this example was prepared by steam-treating a calcined portion of the catalyst of Example 1 for 30 hours at 1200° F. with 15 p.s.i.g. steam.

Catalytic cracking results obtained utilizing the catalysts of Examples 4 and 5 are hereinafter summarized in Table I. It will be seen by reference to such data that the manganese-exchange catalyst was much more selective after the 30 hour steam treatment at 15 p.s.i.g. and 1200° F. In comparison to the standard curve for silica-alumina catalyst, the manganese-containing catalyst afforded the following advantages: 4.9 volume percent more $C_5+$ gasoline, 4.3 volume percent less $C_4$'s, 1.2 weight percent less dry gas and 0.5 weight percent less coke. In contrast, the calcium-containing catalyst of Example 3, after only 10 hours steam-treating at the same conditions afforded only about 0.3 volume percent more $C_5+$ gasoline, 0.4 volume percent more $C_4$'s, 0.8 weight percent less dry gas and 1.1 weight percent less coke compared to the standard silica-alumina catalyst.

The described evaluation of the above catalysts is shown in Table I now set forth below:

TABLE I

|  | Example | | | |
|---|---|---|---|---|
|  | 2 | 1 | 4 | 5 |
| Base Exchange Solution | $CaCl_2$ | $MnCl_2$ | $CaCl_2$ | $MnCl_2$ |
| Composition: | | | | |
| Na, Wt. percent | 0.21 | 0.4 | 0.21 | 0.4 |
| Ca, Wt. percent | 5.74 | | 5.74 | |
| Mn, Wt. percent | | 7.3 | | 7.3 |
| $Al_2O_3$, Wt. percent | 13.0 | | 13.0 | |
| Physical Properties: | | | | |
| App. Dens., g./cc. | 0.55 | 0.68 | 0.55 | 0.71 |
| Surface Area, m.²/g.: | | | | |
| Fresh | 505 | | 505 | |
| Steamed | 339 | 178 | | 107 |
| Catalytic Evaluation: | | | | |
| Conversion, Vol. percent | 58.5 | 49.0 | 31.3 | 51.3 / 37.6 |
| LHSV | 4 | 4 | 4 | 2 / 4 |
| 10 RVP Gaso., vol. percent | 52.2 | 48.9 | 27.6 | 46.9 / 37.4 |
| Excess, $C_4$'s, vol. percent | 8.8 | 3.2 | 3.9 | 6.6 / 2.8 |
| $C_5+$ Gasoline, vol. percent | 49.5 | 44.6 | 25.8 | 44.2 / 35.0 |
| Total $C_4$'s, vol. percent | 11.5 | 7.5 | 5.6 | 9.4 / 5.2 |
| Dry Gas, Wt. percent | 5.2 | 3.8 | 3.5 | 5.4 / 2.9 |
| Coke, Wt. percent | 2.9 | 1.7 | 2.0 | 1.2 / 1.1 |
| $H_2$, Wt. percent | 0.02 | 0.06 | 0.02 | 0.09 / 0.06 |
| Delta Advantage over Std. Cracking Catalyst: | | | | |
| 10 RVP Gasoline, Vol. percent | +8.2 | +9.9 | 0.0 | +6.5 / +4.9 |
| Excess $C_4$'s, Vol. percent | −4.6 | −7.0 | −2.7 | −4.4 / −4.4 |
| $C_5+$ Gasoline, Vol. percent | +7.7 | +7.8 | +0.3 | +6.2 / +4.9 |
| Total $C_4$'s, Vol. percent | −4.1 | −5.1 | +0.4 | −3.8 / −4.3 |
| Dry Gas, Wt. percent | −2.2 | −2.0 | −0.8 | −0.8 / −1.2 |
| Coke, Wt. percent | −1.4 | −1.0 | −1.1 | −2.0 / −0.5 |

The following examples will serve to show that a combined manganese-rare earth exchanged silica-alumina crystalline aluminosilicate catalyst was a more selective cracking catalyst than a comparable catalyst which had undergone base-exchange with rare earth alone.

*Example 6*

The catalyst of this example was prepared in a manner identical with that of Example 1 except that base-exchange of the hydrogel beads was effected with a combined 2 percent by weight aqueous solution of rare earth metal chloride and 2 percent by weight aqueous solution of manganese chloride ($MnCl_2 \cdot 4H_2O$), adding such solution to the hydrogel beads over a 24 hour period and using sufficient solution equivalent to twelve 2-hour changes with ½ volume of solution per volume of beads per change. The rare earth metal chloride employed was derived from monazite sand and contained as its principal constituent cerium chloride, along with the chlorides of praseodymium, lanthanum, neodymium and samarium.

The finished catalyst had a composition of 11.6 weight percent rare earth metal oxide, 0.57 weight percent sodium, 11.5 weight percent alumina, 1.2 weight percent manganese and the balance silica. After steam treatment of the catalyst for 20 hours at 1225° F. and atmospheric pressure, the surface area was 268 m.²/gram.

This catalyst was evaluated for catalytic cracking in the manner described in connection with preceding examples and the data obtained are hereinafter summarized in Table II.

*Example 7*

The catalyst of this example was prepared in a manner identical with that of Example 1 except that the hydrogel beads were base-exchanged with a 2 percent by weight aqueous solution of rare earth metal chloride of the type described in Example 6, using ½ volume of solution per volume of beads. Base-exchange was continued for a total of ten 2-hour and five overnight (approximately 20 hours each) contacts at room temperature (approximately 75° F.).

The finished catalyst in this instance had a composition of 14.5 percent weight rare earth metal oxide, 0.46 weight percent sodium, 11.5 weight percent alumina and remainder silica. After steam treatment of the catalyst for 20 hours at 1225° F. and atmospheric pressure, the surface area was 286 m.²/gram.

This catalyst was evaluated for catalytic cracking as described above and the data obtained are shown in Table II below:

standard silica-alumina catalyst while the catalyst exchanged with rare earth alone (Example 7) was less selective giving only 5.2 volume percent increase in $C_5+$ gasoline, 2.0 volume percent less $C_4$'s, 1.3 weight percent less dry gas and 1.4 weight percent less coke than the standard silica-alumina catalyst.

The following examples illustrate the preparation of combined manganese-magnesia and combined manganese-calcium having a high catalytic cracking activity and good selectivity advantage over the standard silica-alumina catalyst.

*Example 8*

The catalyst of this example was prepared in a manner identical with that of Example 1 except that the hydrogel beads were base-exchanged with a combined 2 percent by weight aqueous solution of manganese chloride $$(MnCl_2 \cdot 4H_2O)$$

and 2 percent by weight aqueous solution of magnesium chloride ($MgCl_2$) continuously for 48 hours.

The finished catalyst had a composition of 1.45 weight percent sodium, 4.9 weight percent magnesium, 5.68 weight percent manganese, approximately 0.2 weight percent alumina and the balance silica. After steaming the catalyst for 20 hours at 1225° F. and atmospheric pressure, the surface area was 176 m.²/gram.

This catalyst was evaluated for catalytic cracking as described above and the data obtained are hereinafter summarized in Table III.

*Example 9*

The catalyst of this example was prepared in a manner identical with that of Example 1 except that the hydrogel beads were base-exchanged with a combined 2 percent by weight aqueous solution of manganese chloride ($MnCl_2 \cdot 4H_2O$) and 2 percent by weight aqueous solution of calcium chloride ($CaC_2$), using ½ volume of solution per volume of beads. Base-exchange was continued for a total of nine 2-hour and three overnight (approximately 20 hours each) contacts at room temperature (approximately 75° F.).

The finished catalyst had a composition of 0.18 weight percent sodium, 5.3 weight percent calcium, 2.75 weight percent manganese, 16.8 weight percent alumina and remainder silica. After steaming the catalyst for 20 hours at 1225° F. and atmospheric pressure, the surface area was 264 m.²/gram.

TABLE II

| | Example No. | |
|---|---|---|
| | 7 | 6 |
| Base Exchange Solution | $(RE)Cl_3 \cdot 6H_2O$ | $RECl_3 \cdot 6H_2O$—$MnCl_2 \cdot 4H_2O$ |
| Composition: | | |
| Na, Wt. Percent | 0.46 | 0.57 |
| Ce, Wt. Percent | 5.92 | 5.19 |
| $(RE)_2O_3$, Wt. Percent | 14.5 | 11.6 |
| Mn, Wt. Percent | | 1.2 |
| $Al_2O_3$, Wt. Percent | 11.5 | 11.5 |
| Physical Properties: | | |
| Apparent Density, g./cc | 0.62 | 0.64 |
| Surface Area, m.²/g., Steamed | 286 | 268 |
| Catalytic Evaluation: | | |
| Conversion, Vol. Percent | 64.3 | 64.6 |
| LHSV | 4 | 4 |
| 10 RVP Gasoline, Vol. Percent | 52.6 | 56.0 |
| Excess, $C_4$'s, Vol. Percent | 12.9 | 10.5 |
| $C_5+$ Gasoline, Vol. Percent | 50.0 | 52.6 |
| Total $C_4$'s, Vol. Percent | 15.5 | 13.9 |
| Dry Gas, Wt. Percent | 7.1 | 6.4 |
| Coke, Wt. Percent | 3.9 | 3.6 |
| $H_2$, Wt. Percent | 0.037 | 0.03 |
| Delta Advantage Over Standard Cracking Catalyst: | | |
| 10 RVP Gasoline, Vol. Percent | +5.6 | +9.0 |
| Excess $C_4$'s, Vol. Percent | −2.5 | −5.0 |
| $C_5+$ Gasoline, Vol. Percent | +5.2 | +7.7 |
| Total $C_4$'s, Vol. Percent | −2.0 | −3.7 |
| Dry Gas, Wt. Percent | −1.3 | −2.1 |
| Coke, Wt. Percent | −1.4 | −1.8 |

It will be seen from the foregoing data that the catalysts of Examples 6 and 7 have similar activities, i.e. about 64 volume percent conversion at 4 LHSV. The selectivity of these catalysts are, however, quite different. Thus, the combined rare earth-manganese exchanged catalyst (Example 6) afforded a 7.7 volume percent increase in $C_5+$ gasoline, 3.7 volume percent less $C_4$'s, 2.1 weight percent less dry gas and 1.8 weight percent less coke than the This catalyst was evaluated for catalytic cracking as described above and the data obtained are shown in Table III below:

TABLE III

| | Example No. | |
|---|---|---|
| | 8 | 9 |
| Base Exchange Solution | $MnCl_2+MgCl_2$ | $MnCl_2+CaCl_2$ |
| Composition: | | |
| Na, Wt. Percent | 1.45 | 0.18 |
| Ca, Wt. Percent | | 5.3 |
| Mg, Wt. Percent | 4.9 | |
| Mn, Wt. Percent | 5.68 | 2.75 |
| $Al_2O_3$, Wt. Percent | | 16.8 |
| Physical Properties: | | |
| Apparent Density, g./cc. | 0.56 | 0.63 |
| Surface Area, m.²/g., Steamed | 176 | 264 |
| Catalytic Evaluation: | | |
| Conversion, Vol. Percent | 57.1 | 62.2 |
| LHSV | 4 | 4 |
| 10 RVP Gasoline, Vol. Percent | 51.5 | 55.8 |
| Excess $C_4$'s, Vol. Percent | 8.8 | 8.9 |
| $C_5+$ Gasoline, Vol. Percent | 48.5 | 53.0 |
| Total $C_4$'s, Vol. Percent | 11.8 | 11.7 |
| Dry Gas, Wt. Percent | 4.8 | 5.8 |
| Coke, Wt. Percent | 2.1 | 3.2 |
| $H_2$, Wt. Percent | 0.07 | 0.04 |
| Delta Advantage Over Standard Cracking Catalyst: | | |
| 10 RVP Gasoline, Vol. Percent | +8.0 | +9.9 |
| Excess $C_4$'s, Vol. Percent | −4.0 | −5.6 |
| $C_5+$ Gasoline, Vol. Percent | +7.3 | +9.2 |
| Total $C_4$'s, Vol. Percent | −3.2 | −5.1 |
| Dry Gas, Wt. Percent | −2.4 | −2.1 |
| Coke, Wt. Percent | −1.9 | −1.6 |

It will be evident from the above data that the catalysts of Examples 8 and 9 are active and selective cracking catalysts affording an improvement in yield at $C_5+$ gasoline respectively of 7.3 and 9.2 volume percent over the standard silica-alumina catalyst.

The following example serves to illustrate a catalyst of manganese type A zeolite contained in a clay matrix.

*Example 10*

Manganese type A zeolite was prepared by base exchanging a 1 pound sample of sodium A type zeolite having uniform pore openings of about 4 angstrom units with 120 lb. of a 2 percent solution of $MnCl_2 \cdot 4H_2O$ in water at 180° F. over a 3 day period. The resulting product was washed for 5 days and then dried at 230° F. It contained 17.3 weight percent manganese.

Five grams of the above material was mixed with 5 grams of clay by ball milling the two together for ½ hour. The composite was pelleted and then crushed to 14 x 25 mesh particles. These were calcined 10 hours at 1000° F. in air.

A sodium A-clay composite, utilized as a comparative test standard, was prepared by mixing 5 grams of sodium A type zeolite with 5 grams of clay and treated in exactly the same manner as above.

Each of the above composites were employed for cracking hexane in a standardized test. Such test involved passing n-hexane over a small amount of catalyst contained in a reactor and analyzing the products obtained by gas chromatography. The conditions of test were as follows:

| | |
|---|---|
| Catalyst volume in reactor cc | 1.5 |
| n-Hexane flow rate cc./hr | 0.6 |
| Liquid hourly space velocity | 0.44 |
| Catalyst to hexane ratio | 46 |
| Temperature ° F | 1000 |

The product sample was taken after 5 minutes on stream and passed into the chromatograph for analysis.

The comparative results obtained for each of the above composites in such test are shown below:

| Catalyst | Percent Conversion | Relative Activity |
|---|---|---|
| Sodium A-clay | 2.2 | 1.0 |
| Manganese A-clay | 4.2 | 1.9 |

As will be evident, the manganese aluminosilicate catalyst afforded almost twice the conversion and possessed almost double the activity achieved with the corresponding sodium aluminosilicate composite.

It will be understood that the above description is merely illustrative of preferred embodiments of the invention, of which many variations may be made within the scope of the following claims by those skilled in the art without departing from the spirit thereof.

What is claimed is:

1. A method for preparing a hydrocarbon conversion catalyst which comprises dispersing in an inorganic oxide matrix a finely divided crystalline alkali metal aluminosilicate having uniform pore openings between 4 and 15 angstrom units, base exchanging the product with a solution of ions selected from the group consisting of manganese ions, manganese ions in admixture with calcium ions, and manganese ions in admixture with magnesium ions to effectively reduce the content of alkali metal in the resulting dry product to less than 4 percent by weight, drying and thermally activating the resulting product by subjecting the same to a temperature in the approximate range of 500° F. to 1500° F.

2. A method for preparing a catalyst characterized by high activity, selectivity and stability in the conversion of heavy petroleum hydrocarbons to lighter materials boiling in the range of gasoline which comprises dispersing in a porous matrix an amount corresponding to between about 2 and about 90 percent by weight of the dry product of finely divided crystalline alkali metal aluminosilicate having uniform pore openings between 4 and 15 angstrom units, base exchanging the product with a solution of ions selected from the group consisting of manganese ions, manganese ions in admixture with calcium ions, and manganese ions in admixture with magnesium ions to effectively reduce the alkali metal content in the base-exchanged product to less than 4 percent by weight on a dry solids basis, drying and thermally activating the resulting product by heating at a temperature in the approximate range of 500° F. to 1500° F. for at least about 1 hour.

3. A method for preparing a hydrocarbon conversion catalyst which comprises dispersing in a porous matrix a finely divided aluminosilicate resulting from substantially complete base exchange of the alkali metal content of a crystalline alkali metal aluminosilicate having uniform pore openings between 4 and 15 angstrom units with a solution of ions selected from the group consisting of manganese ions, manganese ions in admixture with calcium ions, and manganese ions in admixture with magnesuim ions, to effectively reduce the alkali metal content in the base exchanged product to less than 4% by weight on a dry solids basis, and thermally activating the resulting product at a temperature in the approximate range of 500° F. to 1500° F.

4. A method for preparing a catalystic composition useful in hydrocarbon conversion which comprises dispersing in an inorganic oxide sol a powdered crystalline alkali metal alumino-silicate having uniform pore openings between 4 and 15 angstrom units, effecting gelation of said sol containing powdered alkali metal aluminosilicate, base-exchanging the product with an aqueous solution of ions selected from the group consisting of manganese ions, manganese ions in admixture with calcium ions, and manganese ions in admixture with magnesium ions to effectively reduce the alkali metal content in the base-exchanged product to less than 4 percent by weight on a dry solids basis, washing the base-exchanged material free of soluble anions, drying and thermally activating the resulting material at a temperature in the approximate range of 500° F. to 1500° F. for at least about 1 hour.

5. A method for preparing a hydrocarbon conversion catalyst in the form of spheroidal particles which comprises dispersing in an inorganic oxide sol a finely divided crystalline alkali metal aluminosilicate having uniform pore openings between 4 and 15 angstrom units forming spheroidal particles of said sol containing finely divided alkali metal aluminosilicate, effecting gelation of said spheroidal particles of sol, base-exchanging the hydrogel particles with a solution of ions selected from the group consisting of manganese ions, manganese ions in admixture with calcium ions, and manganese ions in admixture with magnesium ions to effectively reduce the alkali metal content of the base-exchanged product to less than 4 percent by weight on a dry solids basis washing the base-exchanged particles free of soluble matter, drying and thereafter thermally activating the product by subjecting the same to a temperature in the approximate range of 500° F. to 1500° F.

6. A method for preparing a catalyst composition which comprises dispersing in an inorganic oxide matrix a finely divided crystalline aluminosilicate having uniform pore openings between about 4 and about 15 angstrom units resulting from substantially complete base exchange of the alkali metal content of a crystalline alkali metal aluminosilicate with a solution of ions selected from the group consisting of manganese ions, manganese ions in admixture with calcium ions, and manganese ions in admixture with magnesium ions and drying and thermally activating the resulting product.

7. A catalytic composition consisting essentially of 2 to 90 percent by weight of a crystalline aluminosilicate having uniform pore openings between about 4 and about 15 angstrom units suspended in and distributed throughout a porous matrix, said aluminosilicate having an alkali metal content of less than 4% by weight and containing ions selected from the group consisting of manganese ions, manganese ions in admixture with calcium ions, and manganese ions in admixture with magnesium ions.

8. A catalytic composition having a sodium content of less than 4 weight percent comprising a finely divided aluminosilicate having uniform pore openings between 4 and 15 angstrom units suspended in and distributed throughout an inorganic oxide matrix, said aluminosilicate containing ions selected from the group consisting of manganese ions, manganese ions in admixture with calcium ions, and manganese ions in admixture with magnesium ions.

9. A process for cracking a hydrocarbon charge which comprises contacting said charge under catalytic cracking conditions with the catalytic composition of claim 7.

10. A process for cracking a hydrocarbon charge which comprises contacting said charge under catalytic cracking conditions with the catalytic composition of claim 8.

11. In the process of cracking a hydrocarbon charge stream with a solid porous catalyst wherein the products comprise both economically valuable liquid hydrocarbon boiling in the motor fuel range and undesirable by-products of lesser economic significance, the improvement in selectivity evidenced by the production of a substantially greater amount of said valuable liquid hydrocarbon together with concomitant reduction in the yield of undesired by-products from a given hydrocarbon charge, which comprises contacting said charge, under cracking conditions, with a composite comprising a finely divided crystalline aluminosilicate contained in an inorganic oxide matrix, which aluminosilicate is characterized by uniform pore openings between 4 and 15 angstrom units and having an alkali metal content of less than 4% by weight, said aluminosilicate containing ions selected from the group consisting of manganese ions, manganese ions in admixture with calcium ions, and manganese ions in admixture with magnesium ions.

References Cited

UNITED STATES PATENTS

| | | | |
|---|---|---|---|
| 2,962,435 | 11/1960 | Fleck et al. | 208—119 |
| 2,971,903 | 2/1961 | Kimberlin et al. | 208—119 |
| 2,982,719 | 5/1961 | Gilbert et al. | 208—120 |
| 2,983,670 | 5/1961 | Seubold | 208—110 |
| 3,140,251 | 7/1964 | Plank et al. | 208—120 |
| 3,210,267 | 10/1965 | Plank et al | 208—120 |
| 3,236,762 | 2/1966 | Rabo et al. | 208—120 |
| 3,264,208 | 8/1966 | Plank et al. | 208—120 |

DELBERT E. GANTZ, *Primary Examiner.*

A. RIMENS, *Assistant Examiner.*